UNITED STATES PATENT OFFICE.

EMILE BOHON, OF PARIS, FRANCE, ASSIGNOR TO JACQUES SLOAN, OF PARIS, FRANCE, AND SAID EMILE BOHON.

PRODUCTION OF SOLUBLE NITROGEN COMPOUNDS FROM ORGANIC SUBSTANCES OF ANIMAL ORIGIN.

1,138,348.     Specification of Letters Patent.     Patented May 4, 1915.

Application filed February 20, 1914. Serial No. 820,034.

*To all whom it may concern:*

Be it known that I, EMILE BOHON, a citizen of the Republic of France, and resident of Paris, France, have invented a new and useful Production of Soluble Nitrogen Compounds from Organic Substances of Animal Origin, which is fully set forth in the following specification.

This invention relates to a process by means of which organic material of animal origin can be dissolved with a view to producing, by concentrating the solutions thus prepared, perfectly soluble compounds containing the entire quantity of nitrogen formerly contained in the material treated.

As will be understood, this process can be utilized to produce either a dry extract or a concentrated solution of meat or of fish, capable of forming a food product if fresh meat or fresh fish was originally used, or of forming a fertilizer if contaminated organic material was originally used.

The process chiefly consists in treating the raw material which is to be used and which may consist of fresh meat or fish, bad meat or fish, old leather, hair, etc., reduced to small fragments, with a slightly caustic solution of sodium or potassium compounds, preferably with a special solution having a sodium base, the preparation of which will be hereinafter specified. The process is carried out hot; as soon as the material has been completely dissolved all the fats or oils contained therein, which rise to the top, can be separated from the mass. When the dissolving step is effected in this manner, the nitrogen contained in the material treated, has the tendency to become liberated in the atmosphere; the solution is then neutralized by the addition of an acid, for instance hydrochloric acid. The addition of acid must be stopped as soon as neutralization is complete, for if an excess of acid were added, a precipitate would be produced, which would be entirely contrary to the result which it is desired to obtain by the process, the said result being namely to obtain an extract perfectly soluble in water, by evaporation of the solution to dryness. However, if by utilizing an excessive quantity of acid, a precipitate were produced, the drawback in question could be easily remedied by adding sodium bicarbonate during the stirring, until complete disappearance of the precipitate. Complete neutralization can be moreover obtained by the following method, which, owing to its accuracy, is preferably adopted when it is a question of the manufacture of food products which must be absolutely neutral.

Instead of using the quantity of acid given by calculation, a greater quantity is used, so as to make sure that, after neutralization, the product will always have a slightly acid reaction when tested with litmus paper. In order to destroy the acidity in question, a quantity of sodium bicarbonate, slightly more than sufficient for obtaining the result in question, is added to the mass. Chlorid of sodium, and carbonic acid which escapes, are formed. When the liberation of carbonic acid is terminated, it is certain that the product is no longer acid, and there remains in the mass sodium bicarbonate—a neutral salt which can only assist digestion.

Owing to the addition of acid, or in other words owing to the neutralization of the solution, the nitrogen is no longer liberated and remains therefore in the solution. This solution is then placed into an evaporating apparatus in which it is concentrated: either to any desired degree, or to such an extent as to produce a dry residue. This dry residue, whether it be intended for use as a food, or as a fertilizer, is of course perfectly soluble in water. It must not be forgotten that it is that property that is one of its chief characteristic features.

The accompanying drawing shows diagrammatically, by way of example, the apparatus that can be used for carrying out the process.

Organic material of animal origin, preferably first subjected to the action of a cutting and de-fibering device 1, is conveyed into boiler A where it is dissolved. The said boiler, which is heated either by steam or by a water jacket, according to the material treated, is closed, and the cock of the solvent tank A' is then opened, so as to introduce into the boiler a suitable quantity of solvent, the latter having either a sodium or a potassium base. This operation having been completed, steam is admitted into the boiler A or into the water jacket, through the supply pipe 3. The material is then left to boil for from half to three quarters of an hour, or for the time to completely dissolve the material. When this step has been completed, the drain cock of the boiler A is opened, so as to discharge the solution into the settling tank B in which the fats or oils which rise to the top can be skimmed off. After the said operation, the liquid is conveyed into the fixing tank C, also protected from air, in which the neutralization is effected. To that end, the tank C is connected to a tank C' containing hydrochloric acid or other neutralizing agent. The fixing tank C may be provided with stirring devices which rapidly mix the neutralizing agent with the solution. The whole operation is then terminated, and it is sufficient to bring the solution into the concentrating apparatus D in which either the solution may be concentrated to any desired degree or a dry extract perfectly soluble in water may be produced.

The solvent with the sodium base can be prepared in the following manner: Quick lime is slaked in water, the proportions being for instance four parts of lime for sixty parts of water. To the milk of lime thus obtained is added sodium or potassium carbonate (for instance five parts of carbonate sodium or potassium per hundred parts of the milk of lime treated), and the whole is boiled, with continuous stirring, so as to form a bath containing in solution sodium or potassium hydroxid and giving an insoluble deposit of calcium carbonate. The boiling continued until a portion of the liquor clarified by standing, no longer produces effervescence on the addition of hydrochloric acid.

The solution of sodium or potassium hydroxid, produced as described, could of course be obtained by the action of sodium or potassium carbonate on any substance which combines with carbonic acid and on the one hand produces an insoluble substance constituting the deposit, and on the other hand, releases sodium or potassium hydroxid soluble in water. The solution thus obtained is as little caustic as possible, which, during the treatment hereinbefore described, reduces to a minimum the loss of ammonia in the nitrogen contained in the material treated.

When the process forming the subject of the present invention is used for obtaining a manure, the alkaline solution of organic matters is preferably neutralized by means of phosphoric acid, in which case a product is obtained, consisting of nitrogen and phosphoric acid in the form of soluble phosphate, which is of special importance for agricultural purposes, each of the fertilizing elements constituting the same, being entirely soluble and free from any "retrogradation."

The process can be applied to organic substances giving not only a dry extract, but also oils or fats which can be industrially utilized. Thus for instance by treating by the above process whales, cachalots, dauphins, marsouins, sperm whales, seals, cod, herrings, sardines, etc., it will be possible, after the treatments in the boiler A and in the settling tank B have been completed, to extract oils which can be industrially utilized. Under the same conditions, and for obtaining certain special oils, it would also be possible to treat certain portions of fish, such as cod livers etc. This application of the process, not only for obtaining a dry extract soluble in water and containing the whole of the nitrogen of the raw material, but also for obtaining oils contained in the said raw materials, is very economical from the industrial point of view, if it is compared to the process at present used, the exclusive object of which is to extract certain oils, such as for instance fish oils.

As will be understood, it is possible, when owing to special circumstances, no value is attached to the final dry product obtained to limit the process to obtaining oils, as already stated; even when limited in that way, the process is an economical one, and moreover gives the whole of the oil contained in the substance treated, without any modification and without mixture with the organic substances, and consequently in a state of great purity.

Claims:

1. The herein-described process of producing nitrogen compounds perfectly soluble in water from organic substances of animal origin, which consists in boiling such substance in a caustic alkaline solution to completely dissolve it; removing the oils or fats which rise to the top of the boiling substance; neutralizing the boiled substance by means of an acid; and finally concentrating the boiled and neutralized substance.

2. The herein-described process of producing nitrogen compounds perfectly soluble in water from organic substances of animal origin, which consists in boiling such substance in a caustic alkaline solution, to completely dissolve it; removing the oils or fats which rise to the top of the boiling substance; neutralizing the boiled substance by means of an excess of acid and a quantity of sodium bicarbonate sufficient to destroy the excess of acid; and finally concentrating the boiled and neutralized substance.

3. The herein-described process of producing nitrogen compounds perfectly soluble in water from organic substances of animal origin, which consists in boiling such substance in a hydrated alkaline solution, to completely dissolve it; neutralizing the solution thus produced with hydrochloric acid; and finally concentrating the neutralized solution.

4. The herein-described process of producing nitrogen compounds perfectly soluble in water from organic substances of animal origin, which consists in subjecting such substance to the action of a slightly caustic alkaline solution under heat and pressure, to completely dissolve it; neutralizing the solution thus produced; and finally concentrating the neutralized solution.

In testimony whereof I have signed this specification in the presence of two subscribing witnesses.

EMILE BOHON

Witnesses:
EMILE LEDRET,
HANSON C. COXE.